United States Patent [19]

Einglett et al.

[11] E Patent Number: Re. 31,802

[45] Reissued Date of Patent: Jan. 15, 1985

[54] ROLLER GIN AND FEED SYSTEM INCORPORATING THE SAME

[75] Inventors: Robert R. Einglett, Cataula; John M. Conner, Columbus; William A. Harmon, Columbus; James B. Hawkins, Columbus; William C. Pease, III, Columbus; Donald W. Van Doorn, Columbus, all of Ga.

[73] Assignee: Lummus Industries, Inc., Columbus, Ga.

[21] Appl. No.: 468,988

[22] Filed: Feb. 23, 1983

Related U.S. Patent Documents

Reissue of:

[64] Patent No.: 4,262,390
Issued: Apr. 21, 1981
Appl. No.: 40,689
Filed: May 21, 1979

[51] Int. Cl.[3] ..... D01B 1/06

[52] U.S. Cl. ..... 19/50; 19/64.5

[58] Field of Search ..... 19/48 R, 50, 51, 52, 19/53, 54, 64.5, 0.2–0.25, 39, 55 R, 204, 97.5, 105, 239, 240, 300; 364/470

[56] References Cited

U.S. PATENT DOCUMENTS

| | | | |
|---|---|---|---|
| 2,607,958 | 8/1952 | Rusca et al. | 19/50 |
| 2,760,236 | 8/1956 | Garrison et al. | 19/55 R |
| 2,962,769 | 12/1960 | Day | 19/55 R |
| 2,973,559 | 3/1961 | O'Neal | 19/50 |
| 3,032,830 | 5/1962 | Van Doorn et al. | 19/55 R |
| 3,251,094 | 5/1966 | Vandergriff | 19/50 X |
| 3,495,303 | 2/1970 | Slover | 19/55 R |
| 3,543,350 | 12/1970 | Malkov | 19/50 |
| 3,769,658 | 11/1973 | Brooks | 19/64.5 |
| 3,991,442 | 11/1976 | Miroshnichenko et al. | 19/53 |
| 4,094,043 | 6/1978 | Vandergriff | 19/53 |
| 4,153,976 | 5/1979 | Vandergriff | 19/53 |

FOREIGN PATENT DOCUMENTS

| | | | |
|---|---|---|---|
| 602619 | 4/1978 | U.S.S.R. | 19/64.5 |

*Primary Examiner*—Louis Rimrodt
*Attorney, Agent, or Firm*—Woodford R. Thompson, Jr.

[57] ABSTRACT

Disclosed is an improved ginning system incorporating a roller gin and a feeder for the same. Means is provided for presenting the cotton to the roller gin substantially one lock at a time. Incorporated in the gin is means to move the ginning roller into and out of ginning relation to the ginning knife, and means is provided in the system to cause the ginning roller to move out of ginning relation to the knife whenever there is less than a predetermined amount of seed cotton in the feeder.

13 Claims, 9 Drawing Figures

4
10
39
41
11
12
51
13
13a
14
4

FIG. 5
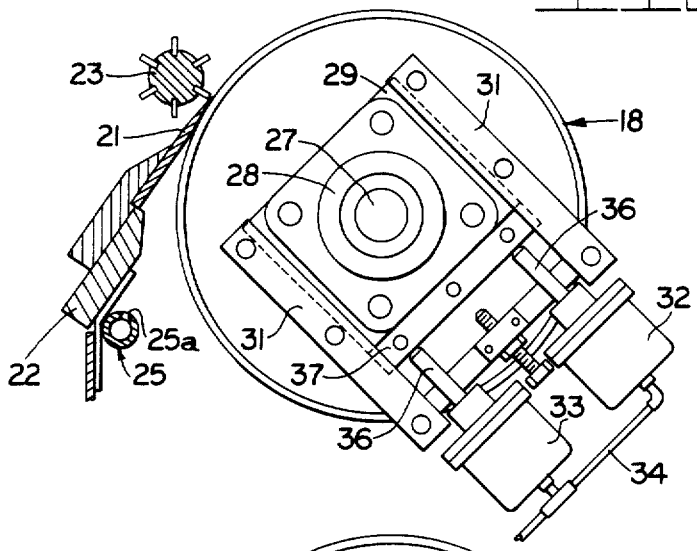
FIG. 6
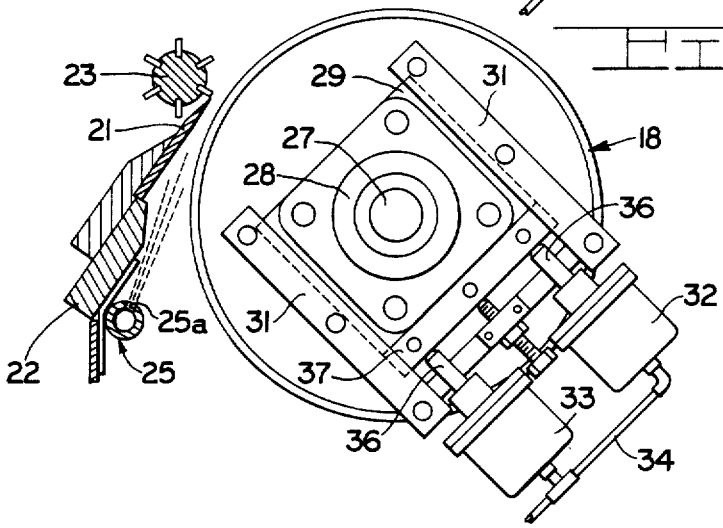
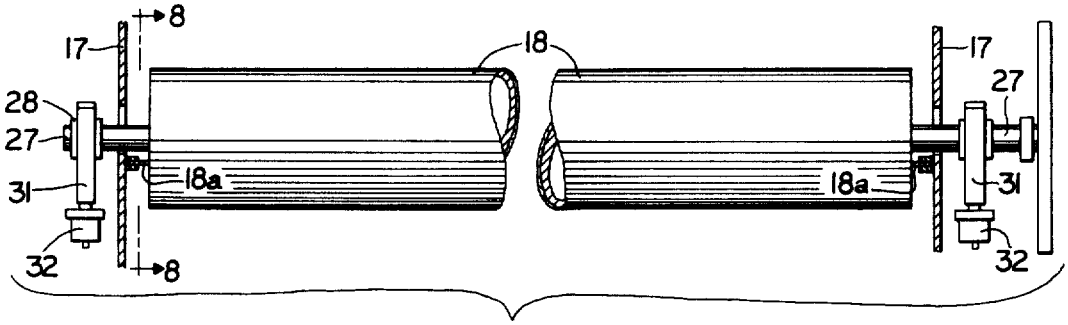
FIG. 7

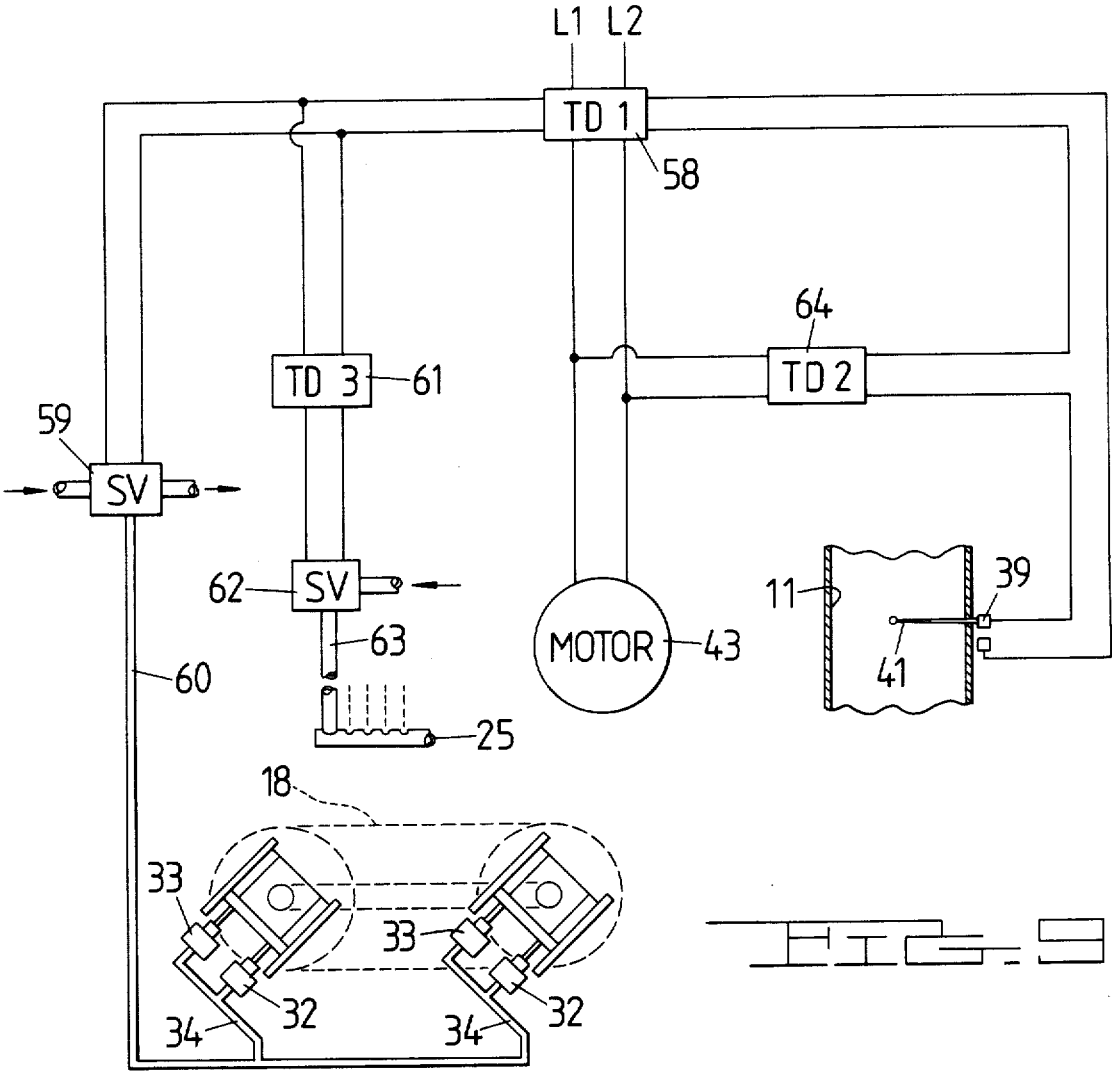
FIG. 9
FIG. 8
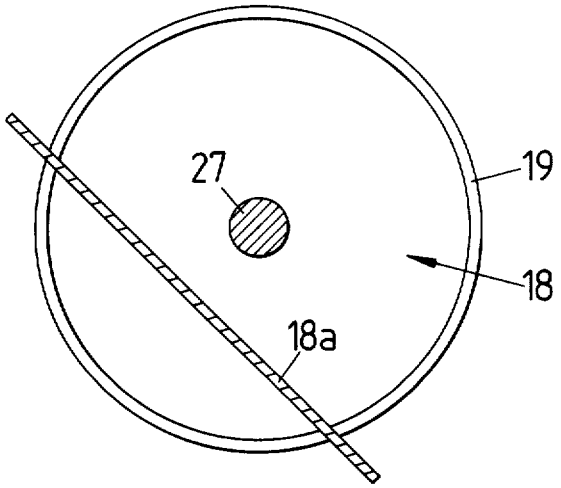

ROLLER GIN AND FEED SYSTEM INCORPORATING THE SAME

Matter enclosed in heavy brackets [ ] appears in the original patent but forms no part of this reissue specification; matter printed in italics indicates the additions made by reissue.

This invention relates to a ginning system incorporating feed means and a roller gin for ginning the cotton.

In recent years the capacity of individual roller gin stands has been improved by the introduction of a rotary knife used in conjunction with a stationary knife working against the main roller of the gin. While this combination is a great improvement over the prior roller gins, nevertheless it is still dependent upon a very uniform feed of seed cotton in single locked condition to obtain maximum efficiency. As is understood in the trade, single locking is the plucking apart of the several seed locks within the cotton boll so that each seed with its remaining fiber is a separate element. Because of the nonuniformity of feeding roller gin stands, not only is the capacity of the roller gin diminished, but also the ginning rolls, sometimes called packing rolls, are exposed to excess heat and wear when the stationary knife is allowed to run for long periods of time without cotton fibers passing between the knife and the roll. Once the ginning roll becomes worn nonuniformly it is impossible to obtain full efficiency from the gin.

As this description proceeds it will be seen that the object of the invention is to provide several, distinct and coordinated improvements in roller gins and systems for feeding the same. First, it is an object of the invention to enhance the single locking action of the feeder which feeds the gin stand. Second, the invention has for an object to assure a uniform feed of the cotton across the entire width of a ginning roll. Third, the invention has for an object to stop the build-up of heat and wear of the ginning roll and any time there is not a full supply of cotton available to the gin stand. Fourth, we propose means to clean the ginning knife periodically during operation of the gin.

Briefly, in our invention there is a sensor in the hopper between the conveyor distributor and the feeder over the gin stand. While the sensor may take various forms, an arrangement which we have found to be satisfactory is a switch with a feeler arm located in the hopper so that when there is not sufficient cotton supplied to the conveyor distributor to fully feed across the feeder, and hence across the gin, the sensor will provide a signal. This signal immediately stops the feed rollers at the upper entrance to the feeder. This in turn stops the flow of cotton into the feeder. We provide a time delay which allows the cotton to empty from the feeder, beneath the feed rolls and to clear the ginning point. The time delay just mentioned is so associated with the mounting mechanism for the roller that the roller is moved out of working contact with the knife, to stop the heat build-up in the ginning roll. Also, in the control circuit we provide means periodically to stop the gin and clean the ginning knife of accumulated lint.

A system illustrating the respective features of our invention is shown in the accompanying drawings forming a part of this application in which:

FIG. 5 is an end elevational view of one of the mechanisms for movably mounting one end of the gin roll shaft;

FIG. 6 is a view corresponding to FIG. 5 and showing the mechanism for moving the opposite end of the ginning roll shaft;

FIG. 7 is a partial, diagrammatic sectional view of the ginning roll and the mechanisms shown in FIGS. 5 and 6, removed from the gin structure itself;

FIG. 8 is an enlarged detail sectional view taken along line 8—8 of FIG. 7; and

FIG. 9 is a wholly diagrammatic wiring and fluid pressure diagram.

Figure 1:
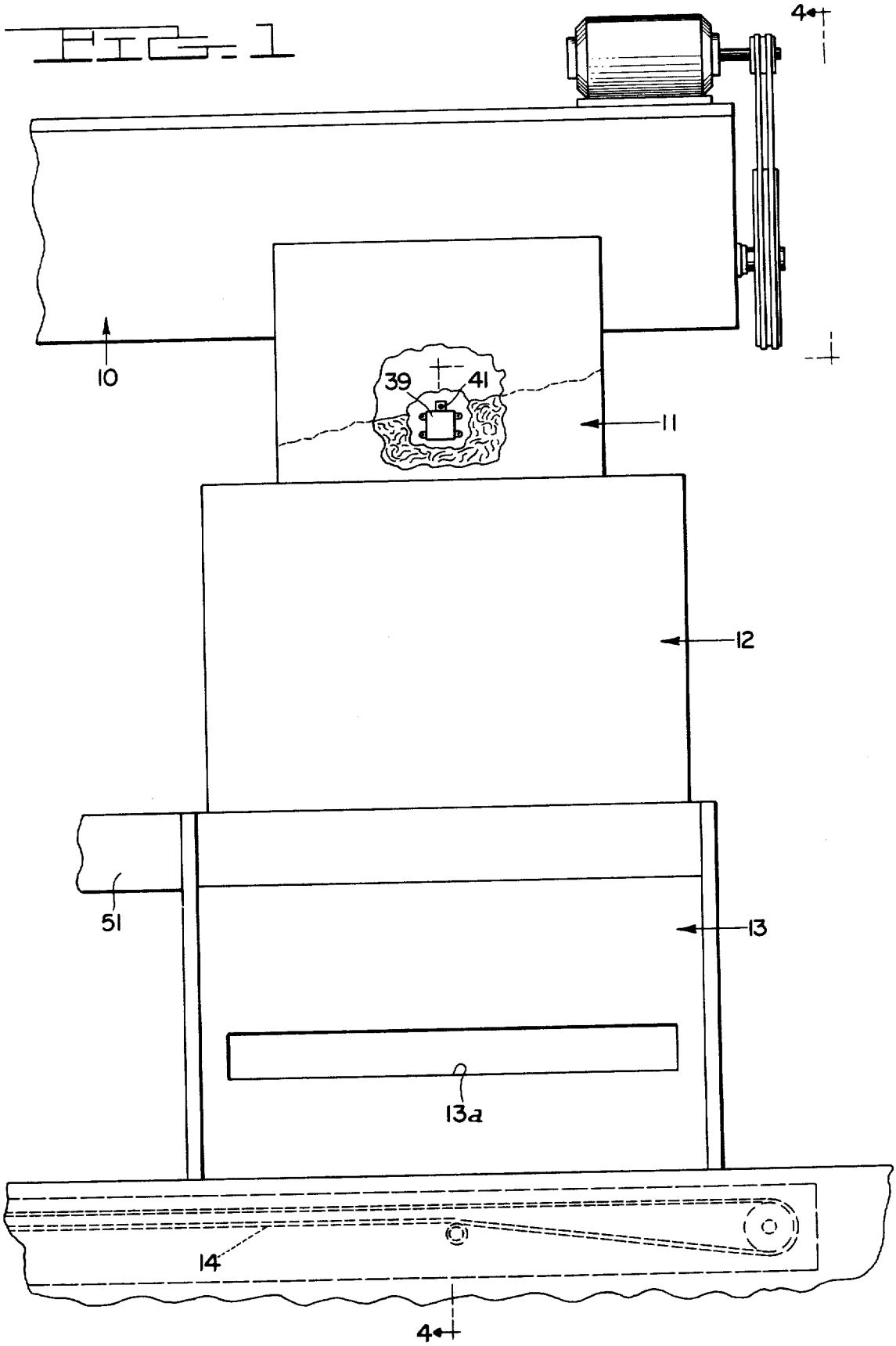
FIG. 1 is a front elevational view, wholly diagrammatic, partly broken away and illustrating a single gin stand with a feeder and an overhead conveyor distributor supplying the seed cotton to the feeder.

Referring now to the drawings for a better understanding of our invention, it will be seen that our improved system comprises generally a conveyor distributor indicated by the numeral 10, a vertically arranged feeder hopper 11, a feeder 12 and a roller gin 13. As is known in the art, the conveyor distributor brings the seed cotton from the pretreatment machines, such as cleaners, dryers and the like, and drops it downwardly by gravity into the feeder 12. The feeder then supplies the seed cotton to the gin 13 for ginning. A conveyor indicated diagrammatically at 14 is located beneath the gin to carry away seed and the lint is discharged from the back of the gin through a lint flue 15 having a suction fan 16 connected thereto. See FIG. 4.

Figure 4:
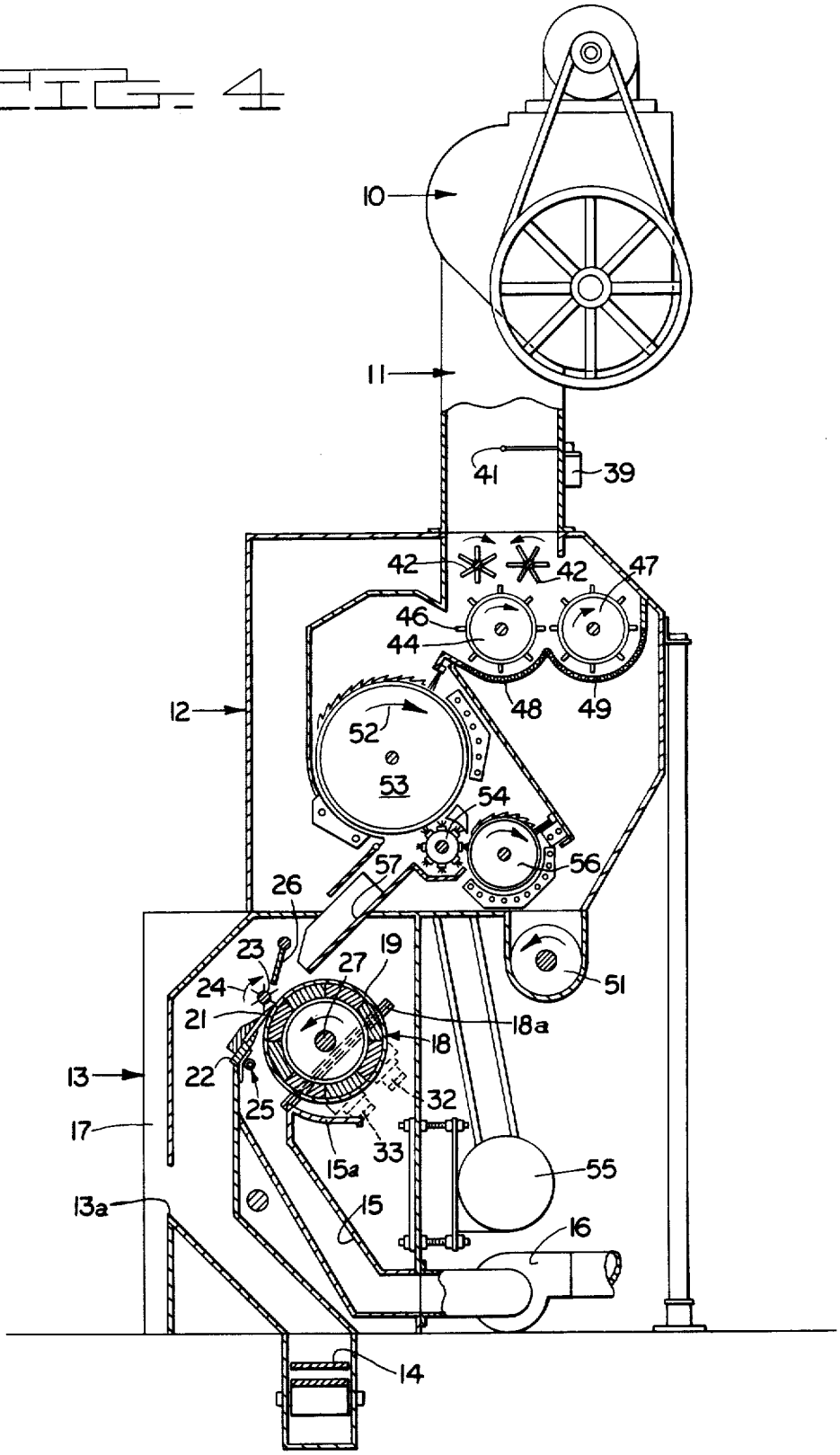
FIG. 4 is a diagrammatic vertical detail sectional view taken along line 4—4 of FIG. 1.

Referring now particularly to FIG. 4 it will be seen that the gin 13 embodies the usual framework or box-like enclosure 17. Mounted in the gin 13 is a ginning roll 18 the outer surface of which is covered with a belting-like material 19 as is understood in the art. A ginning knife is indicated at 21 and is mounted on relatively heavy, supporting framework 22 which spans the gin from end to end so that the knife 21 is coextensive in length with the roll 18.

At 23 we show what is called in the trade a rotor bar 23 which is driven in the direction of the arrow 24. The unit 23 also is substantially the length of the roller 18 and knife 21.

At 26 we show a guide plate which is adjustable toward and from the roller 18 and the purpose of which is to direct the seed cotton down onto the rotating parts as will be explained. Extending the length of the knife is a pipe 25. The pipe has a plurality of upwardly directed openings 25a therein. As will later appear, we propose to supply the pipe with air under pressure, at intervals, thus to remove from the working edge of the knife 21 lint which builds up thereon.

As stated, the entire roll 18 is so mounted that it may be moved into and out of operating or ginning contact with the knife 21. Thus, the roll 18 is provided with a shaft 27. Each end of the shaft 27 is mounted in bearings 28. These bearings in turn are mounted on slide blocks or plates 29. The slide blocks or plates 29 are mounted in guides 31 suitably secured to the end framework of the gin structure.

At 32 and 33 we show pairs of fluid pressure cylinders, for instance air cylinders, to which air under pressure may be supplied from lines 34. These cylinder pairs are suitably mounted on the gin framework so that the piston rods 36 thereof engage cross members 37 forming a part of the slide system for supporting the ends of the shaft 27. Thus, whenever pressure is applied to the cylinders 32 and 33 the roll 18 is pressed into ginning contact with the ginning knife 21. When pressure is released, due to the upward inclination of the slide assemblies, roll 18 moves by gravity downwardly and away from the knife 21, so that its surface 19 no longer frictionally engages the knife.

A normally open switch 39 is mounted on the side wall of the feeder hopper 11. This switch has an arm 41 which projects into the feeder hopper as shown particularly in FIGS. 1 and 4. Switch 39 is so positioned that whenever there is less than a predetermined amount of seed cotton in the feeder hopper the switch opens, for a purpose later to be described.

The feeder 12 comprises a pair of feed rolls 42. These may be in the form of spiked members and they are driven by a variable speed electric motor 43 through suitable chains 43a or the like to rotate in the direction of the arrows, FIG. 4. Seed cotton is delivered downwardly between these rollers at a given rate as determined by the speed of the motor 43.

Immediately beneath the rollers 42 is a spiked cylinder 44, the tips of the spikes 46 of which pass very closely adjacent the tips of the spikes of the rollers 42. Also mounted adjacent the cylinder 44 is another spiked cylinder 47 and these two cylinders run over grids 48 and 49. Trash falling from the grids 48 and 49 is removed from the gin by a conveyor 51.

Driven in the direction of arrow 52 is an extractor saw 53. A brush doffer 54 is associated with the lower periphery of the saw 53. A reclaimer saw 56 also is served by the doffer 54 generally in the customary fashion.

Figure 3:
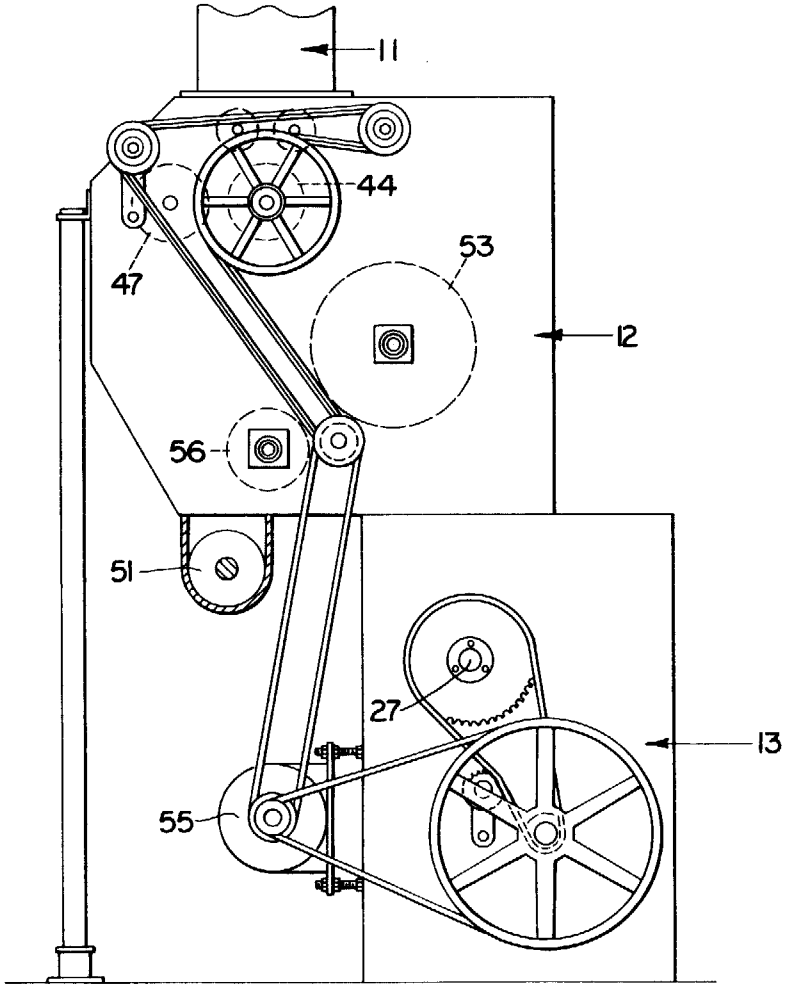
FIG. 3 is an end elevational view looking at the apparatus from the end opposite that of FIG. 2.
Figure 2:
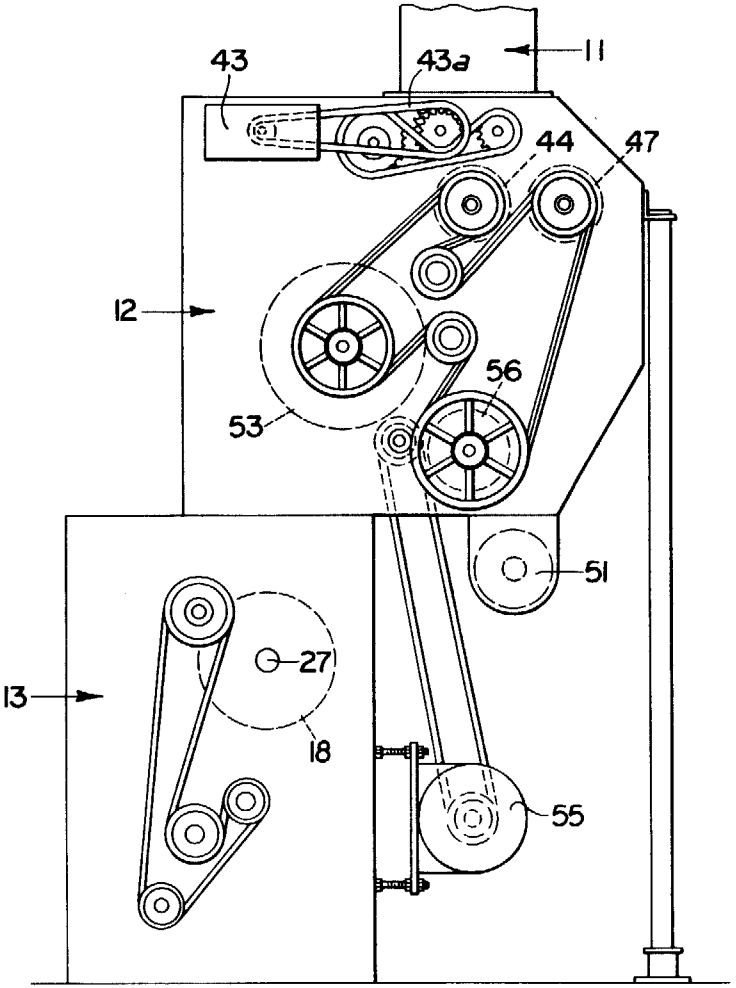
FIG. 2 is an end elevational view looking at one end of the gin and feeder.

From the description so far given with respect to the feeder, seed cotton enters between the rollers 42 which are driven in the direction of the arrows as indicated. The spiked cylinder 44 is driven so that the periphery of its spikes travel faster than the rolls 42 whereby cotton is single locked as it exits from the rolls 42. This single locked cotton then is discharged under the grids 48 and 49 onto the saw 53, finally being doffed down a slide 57 located above the ginning mechanism. The various rotary mechanisms of the gin and feeder (except feed rolls 42) are driven by a motor 55 through the belts and chains shown in FIGS. 2 and 3.

Referring again to gin 13, it will be seen that we provide an opening 13a extending substantially the width of the gin and into the seed discharge section, above the seed belt 14. Also, a plate 15a is spaced beneath the ginning roller to provide for the passage of air beneath roller 18 for a purpose to appear. Between the ends of the roller 18 and the ends of the gin frame we provide strips of sealing material 18a, thus to assure that a flow of air is maintained about the lower periphery of the ginning roller. See FIG. 8.

Referring now to FIG. 9 we will describe, in diagrammatic fashion, the electrical and pneumatic mechanisms associated with our improved system. At 58 we show a time delay mechanism which controls the motor 43 and which in turn controls an electrically operated valve 59 for supplying air to and releasing air from the cylinders 32–33. Thus, when switch 39 is closed it will be apparent that the feeder motor 43 is energized, rotating the feed rolls 42. Similarly, valve 59 is energized whereby air under pressure from a source, not shown, is supplied through a conduit 60 to the conduits 34, whereby the cylinders 32–33 are pressurized, forcing the ginning roll 18 into contact with the knife 21. Let it be assumed that with the system in operation insufficient cotton to gin completely across the gin is present in the hopper 11. In this case the switch 39 opens, timing in the time delay switch 58. [After a given delay the] *The* motor 43 for the feed rolls 42 is deenergized and *after a given delay* the pressure on cylinders 32–33, at both ends of the ginning roll shaft 27 is relased, permitting the ginning roll to move out of working contact with the knife 21. Also, the timing in of timer 58 starts a second timer 61 which opens a solenoid valve 62 to supply air under pressure from a suitable source through a conduit 63 to the perforated conduit 25. The timer 61 is set to blow for a few seconds and then times out and resets itself, ready for a new cycle. Thus, during the times when the switch 39 is open motor 43 is stopped, cylinders 32–33 are pressurized and air, under control of timer 61, is supplied to the conduit 25 to clean away lint which may be draped over the working edge or other parts of the knife 21.

We have found that the accumulation of lint on the working edge of the knife is a serious problem in the operation of this type of gin. Therefore, it is desirable to clean this lint away at given, regular, predetermined periods of time. In order to accomplish this we incorporate as illustrated in FIG. 9 a third timer 64. This timer is set to time in after a given length of time, for instance, six to ten minutes of operation. When this happens timer 64 overrides switch 39, thus shutting down the gin and blowing air onto the knife to clean it. We thus have the capability not only of cleaning the knife whenever the system comes to a halt due to lack of cotton, but also, with the addition of the timer 64 we accomplish this cleaning at predetermined intervals of time in the ginning operation.

It will be noted that the suction fan 16 connected to the lint portion 15 of the gin draws air from the outside over the top of the plate 15a, between that plate and the lower periphery of the ginning roller 18. This air not only serves to doff any lint which may be clinging to the surface of the roller 18, causing it to enter the lint section 15, but also provides a means of cooling the surface 19 of the roller 18.

The opening 13a provided at the front of the gin permits the operator to insert his hand without danger of becoming involved in any moving parts of the machinery, thereby to collect a quantity of the seed, to determine, by inspecting the same, the quality of the ginning being done by the system.

From the foregoing it will be seen that we have devised an improved system for ginning cotton embodying a roller gin and means to assure that the gin is receiving adquate cotton during times when the knife is in contact with the ginning roll. Our improved system incorporates feed apparatus which single locks the cotton assuring that the gin is fed in the most efficient manner possible for such gins. Likewise, we assure more efficient cooling of the surface of the ginning roll by the provision of the plate 15a, providing a space across the ginning roll and at the bottom thereof in communication with the lint section 15. Also, by providing some means such as the pipe 25 to clean the working edge of the knife 21, we further increase the efficiency of the gin and prolong the life of the working surface 19 of the roller 18.

In actual practice our improved system has proven to be very satisfactory and we have increased the capacity of the gin and at the same time have eliminated the uneven wearing of the covering 19 of the roll 18 due to improper or partial supply of cotton to the roller.

While we have shown our invention in but one form, it will be obvious to those skilled in the art that it is not so limited but is susceptible of various changes and modifications without departing from the spirit thereof.

What we claim is:

1. In a cotton ginning system embodying at least one roller gin having a ginning roll, a ginning knife and a feeder having a pair of driven feed rollers disposed to feed seed cotton to the gin, the improvement comprising:

(a) means associated with the feed rollers to single lock bolls of seed cotton passing therethrough, (b) means mounting the ginning roller of movement into and out of ginning relation to the ginning knife, and (c) means responsive to the absence in the feeder of a predetermined minimum amount of seed cotton to move the ginning roller out of ginning relation to the ginning knife.

2. Apparatus as defined in claim 1 in which there is means responsive to the absence in the feeder of said predetermined minimum amount of seed cotton to stop rotation of the feed rollers.

3. Apparatus as defined in claim 2 in which there is means responsive to the absence of said predetermined minimum amount of seed cotton in said feeder to delay for a predetermined time the movement of the ginning roller out of ginning relation to the ginning knife after said feed rollers cease turning, thereby permitting the gin to gin at least some of the cotton already passed by the feed rollers.

4. Apparatus as defined in claim 1 in which the means associated with the feed rollers to single lock cotton passing therethrough comprises a spiked roller having the tips of its spikes spaced closer to the feed rollers than the thickness of a lock of cotton, and means to drive the spiked roller so that its spikes travel at a greater linear rate of speed than the feed rollers, whereby bolls of cotton momentarily held between the feed rollers are struck by the spikes of said spiked cylinder, thus to single lock the same.

5. Apparatus as defined in claim 1 in which there is means operable when the ginning roll is out of ginning relation to the ginning knife to remove from the ginning knife cotton which accumulates thereon.

6. Apparatus as defined in claim 1 in which there is means to pass a stream of air into contact with the lower surface of the ginning roll, thereby to cool the surface thereof.

7. Apparatus as defined in claim 1 in which said gin is equipped with a passage to receive lint discharged from the ginning roll, a suction fan connected to the passage and effective to discharge lint from the gin, and a space defined by a plate-like member located adjacent the periphery of the ginning roll through which space air from atmosphere is inspirated by said suction fan, thereby cooling the outer surface of the ginning roll.

8. Apparatus as defined in claim 7 in which there are seal means at the ends of the ginning roll effective to prevent the inspiration of air from the ends of said roll into the lint passage.

9. In a roller gin of the kind having a ginning roll and a ginning knife, together with means mounting the roll and knife for relative movement toward and from each other, the improvement comprising:

(a) means automatically effective, in response to moving the knife and roll relatively apart to non-ginning position to remove cotton which may have accumulated on the knife, thereby decreasing the friction between the knife and the roll.

10. Apparatus as defined in claim 9 in which means to remove said cotton comprises a conduit located adjacent the knife, there being openings in the conduit directed toward said knife, and means to supply air under pressure through said conduit.

11. In a cotton ginning system embodying at least one roller gin having a ginning roll, a ginning knife and a feeder having a pair of feed rollers disposed to feed seed cotton to the gin, the improvement comprising:

(a) means to feed seed cotton substantially in single locks to the ginning roll and ginning knife, (b) means effective to produce relative movement between the ginning roll and knife for moving the same out of ginning position relative to each other, (c) means responsive to the absence in the feeder of a predetermined minimum amount of seed cotton to bring about relative movement between the ginning roll and ginning knife, to position them in inoperative position, (d) means associated with the ginning knife to remove therefrom cotton which accumulates thereon during ginning, and (e) means operable at predetermined times in the ginning cycle to actuate the cotton removing means set forth in (d), above, while the operative parts of the gin are in non-ginning position.

*12. In a cotton ginning system embodying at least one roller gin having a ginning roll and a ginning knife with means for mounting the ginning roll for movement into and out of ginning relation to the ginning knife, and a feeder having a pair of driven feed rolls disposed to feed seed cotton to the gin, the improvement comprising:*

*(a) means responsive to the absence of a predetermined minimum amount of seed cotton at the inlet of the feeder to produce a signal,*

*(b) means to stop the rotation of the feed rollers upon receiving the signal from the means of element (a), above, and*

*(c) means effective after the passage of a predetermined time to move the ginning roll away from the ginning knife in response to said signal.*

*13. In a cotton ginning system embodying at least one roller gin having a ginning roll and a ginning knife with means for mounting the ginning roll for movement into and out of ginning relation to the ginning knife, and a feeder having a pair of driven feed rolls disposed to feed seed cotton to the gin, the improvement comprising:*

*(a) means responsive to the absence of a predetermined minimum amount of seed cotton at the inlet of the feeder to produce a signal,*

*(b) means to stop the rotation of the feed rollers upon receiving the signal from the means set forth in (a), above,*

*(c) means to which said signal is fed and effective after a predetermined time to deliver a second signal, and*

*(d) means responsive to said second signal to move the ginning roll away from the ginning knife.*

* * * * *